(12) United States Patent
Tsui et al.

(10) Patent No.: US 9,827,636 B2
(45) Date of Patent: Nov. 28, 2017

(54) FLANGE PIPE ALIGNMENT TOOL AND FIXTURE

(71) Applicants: Gary Tsui, San Marino, CA (US); Weinan Liu, Monronia, CA (US)

(72) Inventors: Gary Tsui, San Marino, CA (US); Weinan Liu, Monronia, CA (US)

( * ) Notice: Subject to any disclaimer, the term of this patent is extended or adjusted under 35 U.S.C. 154(b) by 0 days.

(21) Appl. No.: 14/713,115

(22) Filed: May 15, 2015

(65) Prior Publication Data
US 2016/0332265 A1    Nov. 17, 2016

(51) Int. Cl.
*B23K 37/053*    (2006.01)
*B23K 37/04*    (2006.01)

(52) U.S. Cl.
CPC ................. *B23K 37/0536* (2013.01)

(58) Field of Classification Search
CPC ............ B23K 37/0536; B23K 37/0452; B23K 37/0461; B23Q 3/064
USPC .......................... 228/49.3; 269/48.1, 52, 233
See application file for complete search history.

(56) References Cited

U.S. PATENT DOCUMENTS

| | | | | |
|---|---|---|---|---|
| 167,127 A | * | 8/1875 | Sandbach | B25B 5/102 269/107 |
| 351,871 A | * | 11/1886 | Lampert | G04D 1/10 269/156 |
| 562,516 A | * | 6/1896 | Evans | G04D 1/10 269/156 |
| 648,763 A | * | 5/1900 | Barge | B67B 7/34 279/114 |
| 1,456,525 A | * | 5/1923 | West | B67B 7/32 24/524 |
| 1,889,986 A | * | 12/1932 | Haywood | B23K 3/08 269/156 |
| 2,094,225 A | * | 9/1937 | Tuttle | B23B 5/163 269/156 |
| 2,690,915 A | * | 10/1954 | Pealer | B23B 31/16012 269/233 |
| 2,736,286 A | * | 2/1956 | Britton | B23K 37/0536 269/19 |
| 2,767,677 A | * | 10/1956 | Johnson | B23K 37/0536 269/48.1 |
| 2,887,079 A | * | 5/1959 | Wilson | B23K 37/0536 269/101 |
| 2,921,785 A | * | 1/1960 | Underhill | B23Q 3/06 269/156 |
| 3,618,929 A | * | 11/1971 | Upchurch | B05B 15/0431 118/503 |
| 3,649,036 A | * | 3/1972 | Harz | B24D 9/02 269/48.1 |
| 3,667,128 A | * | 6/1972 | Morgan | F16L 1/20 269/37 |
| 3,762,068 A | * | 10/1973 | Clay | G01C 9/24 33/372 |

(Continued)

*Primary Examiner* — Marc Carlson
(74) *Attorney, Agent, or Firm* — Jen-Feng Lee, Esq.

(57) ABSTRACT

Present invention provides a universal fixture that fits a broad range of flange/pipe sizes, covering the common sized 4-hole to 24-hole flanges. The present invention solves the end play issue (between the mounting studs and the screw holes of the flange) by aligning the centers of the flange to the center of the pipe, relying on the center hole of the OH plate. An additional accessory can be used to set adjustable height support, for propping up pipes and balance the weight, facilitating the ease of handling the welding work.

10 Claims, 12 Drawing Sheets

(56) References Cited

U.S. PATENT DOCUMENTS

| | | | | |
|---|---|---|---|---|
| 3,822,481 | A * | 7/1974 | Doan | G01C 9/26 |
| | | | | 33/371 |
| 4,222,577 | A * | 9/1980 | Giffin | B23B 31/16004 |
| | | | | 269/156 |
| 5,329,227 | A * | 7/1994 | Sinclair | G01R 1/0433 |
| | | | | 324/756.02 |
| 5,362,036 | A * | 11/1994 | Whiteman | B23K 37/0461 |
| | | | | 269/303 |
| 6,386,421 | B1 * | 5/2002 | Anderson | B23K 37/0531 |
| | | | | 228/44.5 |
| 8,141,857 | B2 * | 3/2012 | Wang | B23Q 3/062 |
| | | | | 269/107 |
| 8,523,190 | B2 * | 9/2013 | Bauer | B25B 5/08 |
| | | | | 279/110 |
| 8,690,140 | B2 * | 4/2014 | Rasmussen | F03D 1/005 |
| | | | | 269/296 |
| 9,144,867 | B2 * | 9/2015 | Li | B25B 5/142 |
| 2006/0157942 | A1 * | 7/2006 | Ferrari | B60C 25/0545 |
| | | | | 279/114 |
| 2016/0016267 | A1 * | 1/2016 | Beatty | B23K 37/0452 |
| | | | | 29/559 |

\* cited by examiner

FLANGE PIPE ALIGNMENT TOOL AND FIXTURE

FIELD AND BACKGROUND OF THE INVENTION

A flange is a ring-like structure, or a collar, that is attached to a pipe for the purposes of providing support when pipes are connected, by welding or by other means, or for other purpose as the pipes are installed on locations.

Currently in the field, different size flanges require different fixtures to set up for pipe-flange welding. Some specially designed Flange Mounting Plate fits a number of flange sizes and pipe sizes, but the range is relatively small. Consequently, several Flange Mounting Plates of different sizes are required to cover most of the commonly used flanges.

There are also another type of commonly found Flange Clamping Plate that requires as many as five (5) sizes to make it useful across the full spectrum of the common flange size that ranges from 4 to 24 holes. As such, there is a high level of unwieldiness at job sites performing flange/pipe welding task, due to the limited capacity and flexibility of the tool or fixture for such purpose.

Present invention provides a universal fixture that fits a much broader range of flange/pipe sizes, so that the welding to be performed at a job site is made easier due to the flexibility of the fixture introduced herein.

Additionally, some Flange Mounting Plate currently used in the field caused some unnecessary end play between the mounting studs and the screw holes of the flange, due to the off-alignment of studs on account of the weight of the flange at time of working. The present invention solves the end play issue by aligning the centers of the flange to the center of the pipe, relying on the center hole of the OH plate.

SUMMARY OF THE INVENTION

The invention relates to the tool and fixture used for welding flanges of various sizes. Instead of equipping workers with different tools and fixtures to deal with welding pipes and flanges of different sizes, present invention provides a universal set of tool and fixture that encompasses a broader range of pipe/flange sizes.

By using a plate assembly comprising an OH plate (with symmetrical curved slots), the present embodiment uses an oval-shaped plate, and an S plate (with symmetrical grooves), the present embodiment uses a generally square-shaped plate, the OH plate will be able to rotate as worker(s) adjust to the size/diameter of the pipe/flange, causing the screws to fit properly to the holes, no matter the size of the pipe/flange, as long as the size (and number of screw holes) is within the range designed.

The pairs of grooves are designed to have specific angles, so that the sliding blocks can be moved back and forth within each pair of the grooves, and the corresponding stud and screw being fastened to the curved slots on the OH plate, as needed and dictated by the flange/pipe size, using only one set of welding fixture, as intended by present application.

The range of flanges for use with pipes that can benefit from the present invention encompasses the 4-, 8-, 12-, 16-, 20- and 24-hole flanges, as shown in FIG. 7.

The angle between two adjacent holes for each type of flange is shown, in the customary fashion where the vertical and horizontal positions are defined as having the two top holes of a particular flange being on a horizontal level.

DESCRIPTION OF THE DRAWINGS

The accompanying drawings, which are incorporated in and constitute a part of this specification, illustrate and exemplify the preferred embodiments of the invention. Together with the description, serve to explain the principles of the invention.

A brief description of the drawings is as follows.

DETAILED DESCRIPTION OF THE PREFERRED EMBODIMENT

Figure 1:
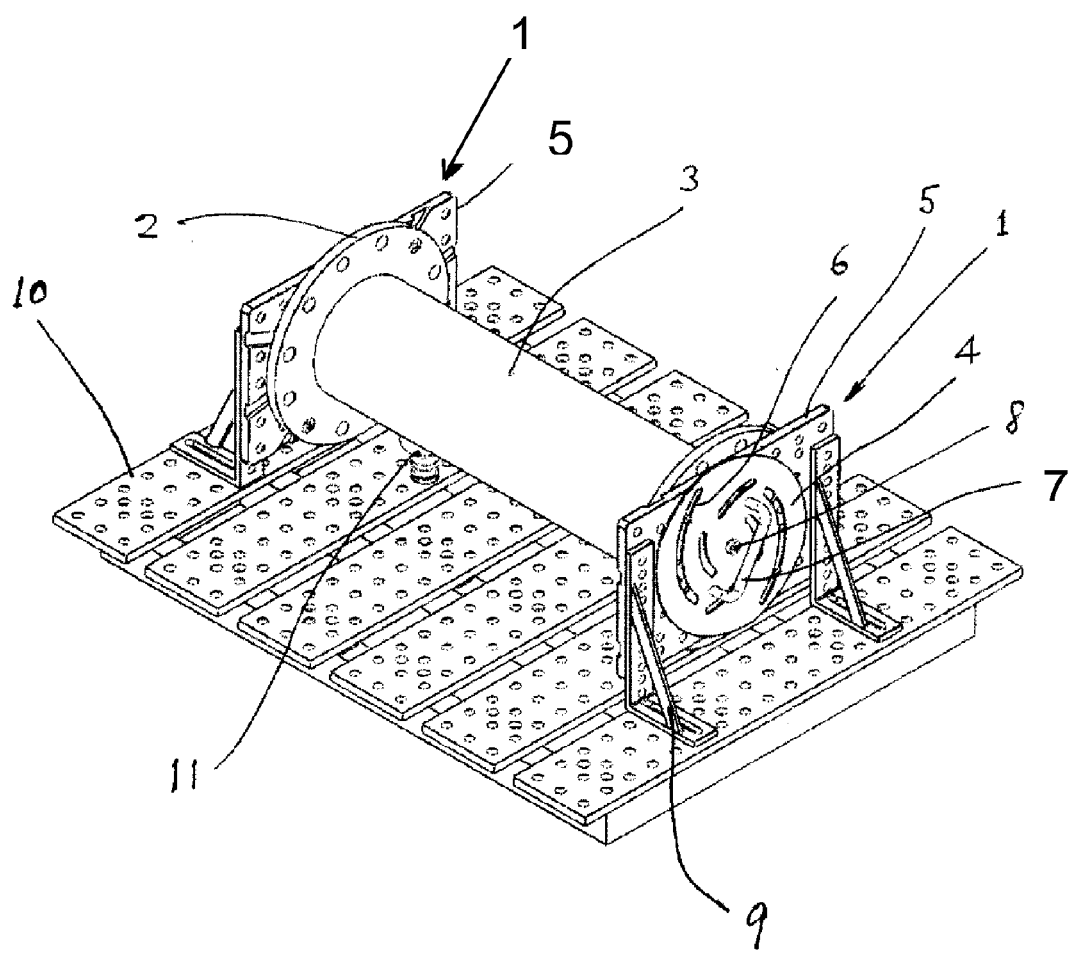
FIG. 1 shows a typical user setup when using the fixture and assembly of present invention to keep the flange/pipe in place for welding operation.

As shown in the figures, the flange pipe alignment tool and fixture 1 of present invention has an OH plate 4 and an S plate 5, that can be placed on a working surface, such as a welding table 10, for facilitating attaching (such as by means of welding) a flange 2 to a pipe 3.

Figure 2:
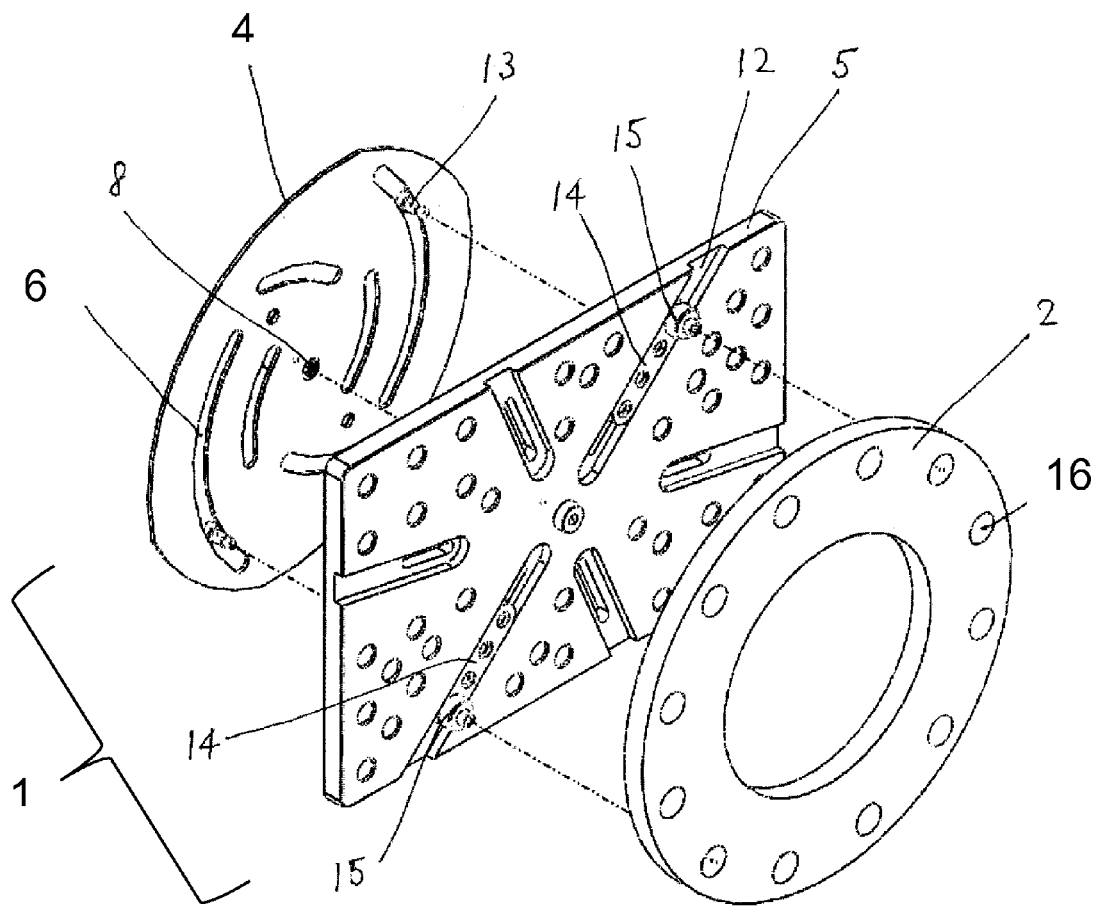
FIG. 2 shows the components in an exploded view of the present invention.
Figure 3:
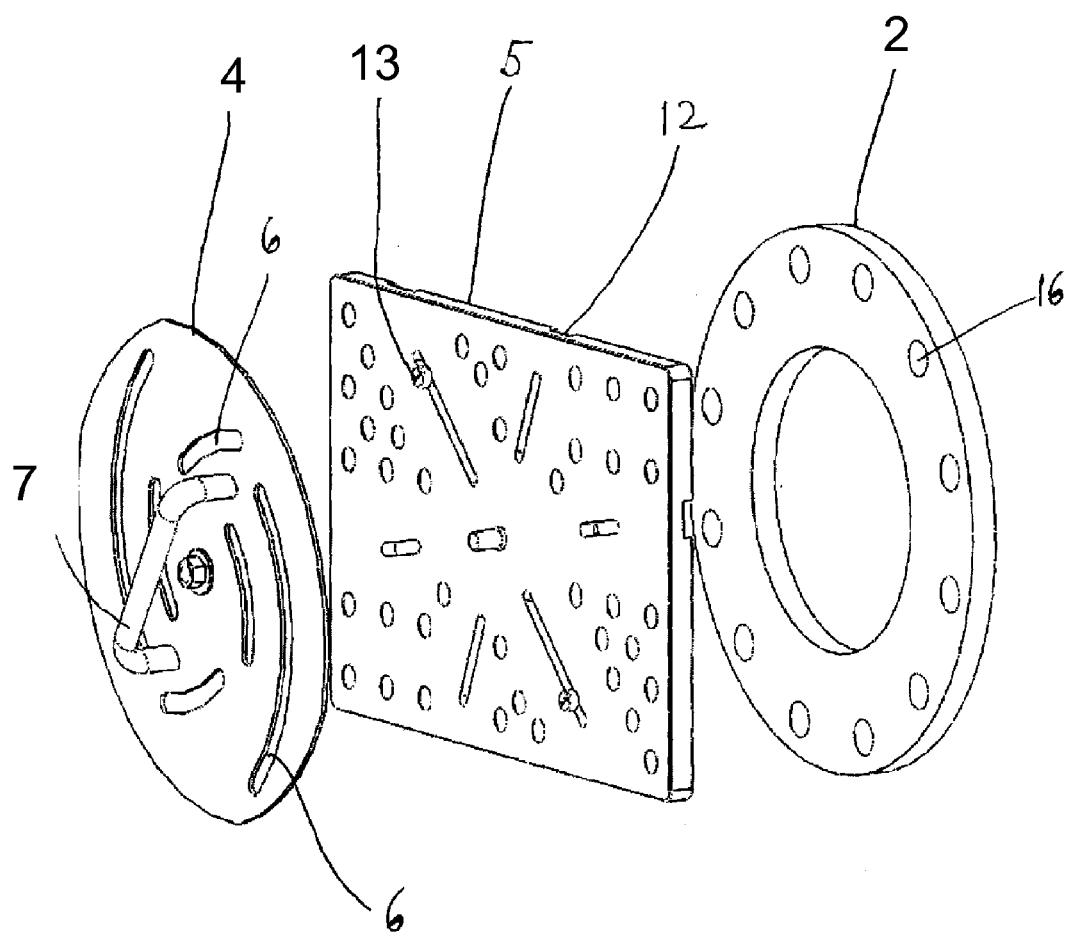
FIG. 3 shows the reverse side of the component exploded view.
Figure 6:
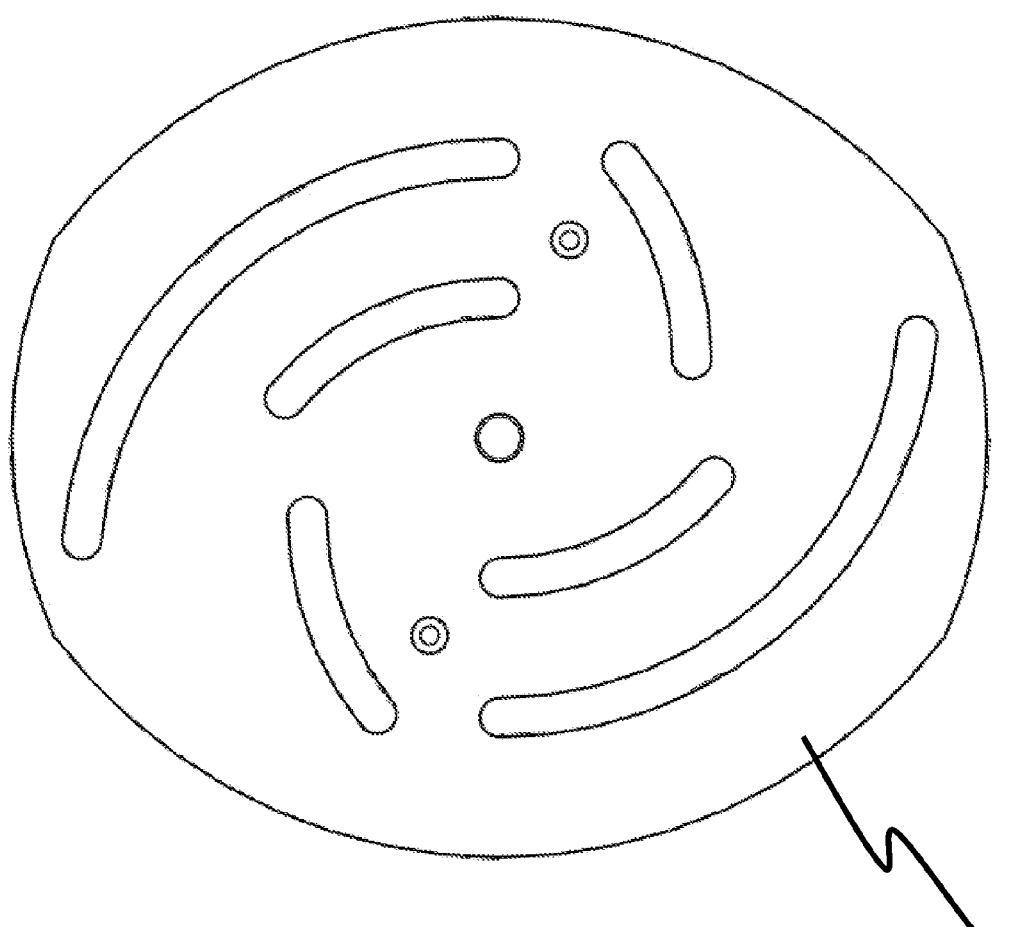
FIG. 6 shows the OH plate, in the shape of an oval in one embodiment.

The OH plate 4 is a flat piece, having a first embodiment in the shape of an oval-shaped disc, with three (3) pairs of symmetric curved slots 6; see FIGS. 2, 3 and 6. Although present application shows 3 pairs of symmetric curved slots 6, additional embodiments may be made with two, four, or five pairs of slots 6, depending on future applications.

A handle 7 is made to one side of the OH plate 4, straddling over the center point 8 of the OH plate 4, so that when a user holds the handle 7 portion of the OH plate 4, the overall weight distribution would feel even to the user.

The S plate 5 is a flat disc, with a first embodiment shown to be generally in the shape of a rectangle. However, as long as it has a straight edge for sitting flushly on a generally flat surface of a work table, such as a welding table 10, even if the S plate 5's shape is in a pentagon shape (5 side), a hexagon shape (6 side), it will work for the purpose of present invention.

The S plate 5 has three (3) pairs of symmetric straight grooves 12; each of the grooves 12 contains an elongated hole. The pairs of grooves are diametrically laid out, radiating from a center hole.

Figure 4:
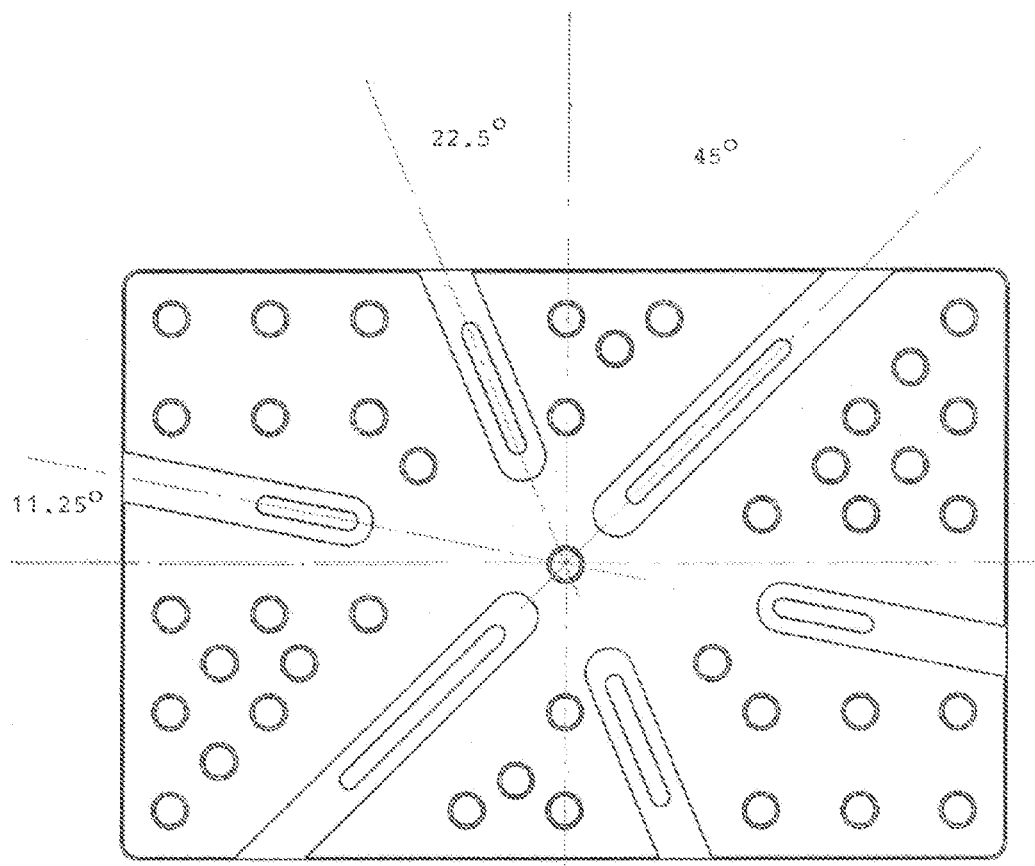
FIG. 4 shows the S plate, having three (3) sets of grooves, with the preferred angles indicated.
Figure 5:
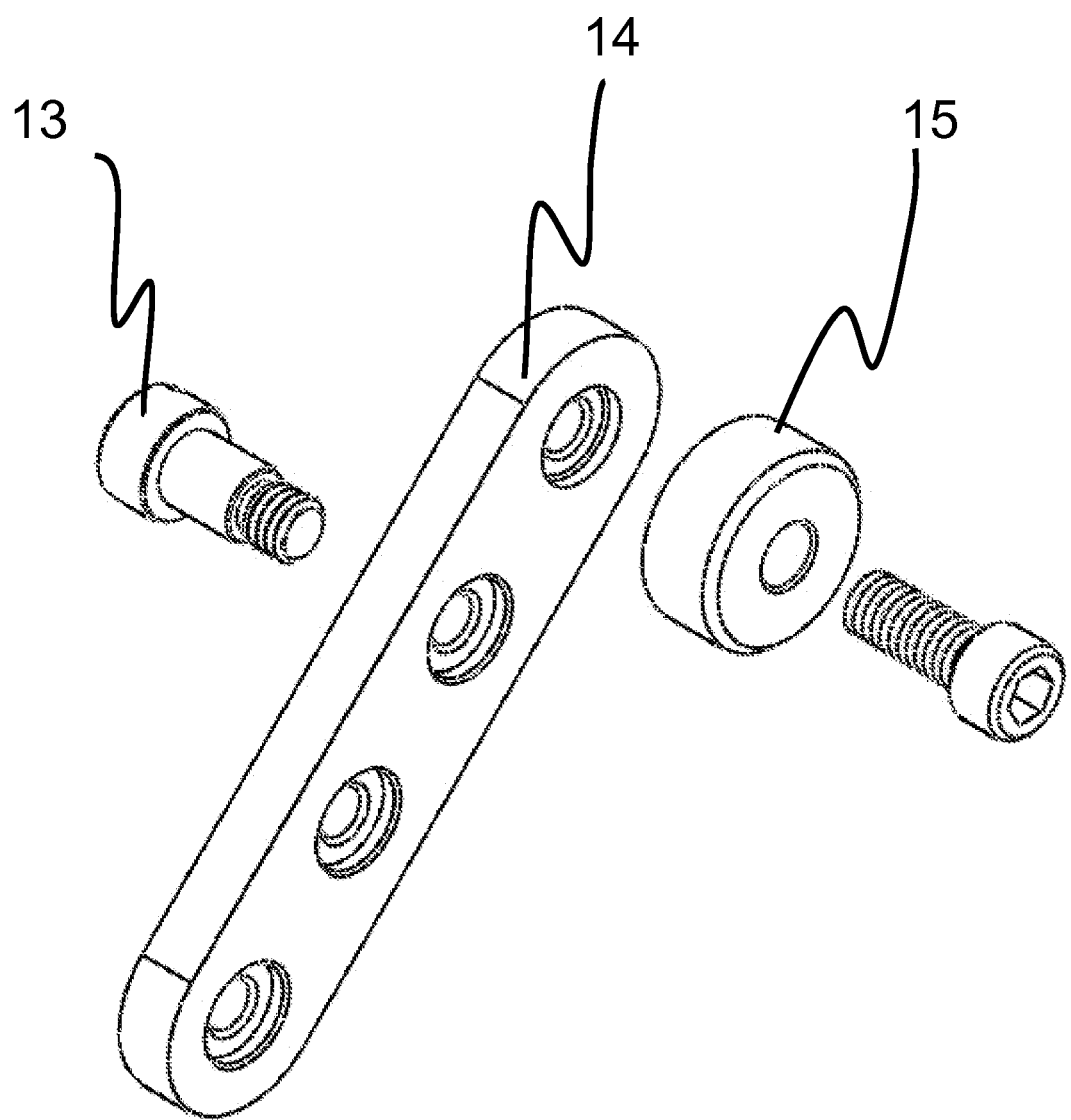
FIG. 5 shows the sliding block, stud and screw.

When the S plate 5 is placed erected on a horizontal surface (as shown in FIG. 1), the 3 pairs of the grooves 12 have angle measurements relative to the horizontal line: one pair is made to have a 11.25-degree angle, a second pair is made to have a 45-degree angle, and a third pair is made to have a 67.5-degree angle. These angles are shown in FIG. 4, though the 67.5-degree angle is shown to be 22.5-degree, to a vertical line.

This 3-angle arrangement enables the present invention to match the standard number of screw holes 16 on flanges 2 ranging from 4, 8, 12, 16, 20 and 24 holes.

More pairs of grooves 12 can be added, if wider ranges of flange holes are needed.

Two sliding blocks 14, each with a stud 15 and a screw 13, are slidable along any pair of grooves 12. As shown in FIG. 2, screws 13 will go through one pair of slots 6 on the OH plate 4 to one pair of grooves 12, and locked to one of the four screw holes on sliding blocks 14. The choice of screw holes depends on the size of the flange 2.

Because of the specially designed curved slots 6, turning the OH plate 4 will make screws 13 and hence studs 15 slid with sliding blocks along grooves 12 inward or outward to fit flanges 2 of different sizes. Studs 15 will be inserted to a pair of screw holes 16 of flange 2.

To use the flange pipe alignment tool and fixture of present invention, mount two of the plate assemblies 1 on a welding table 10, separated by a distance lightly larger than the length of a pipe 3. Hold one flange 2 next to one S plate 5; turn the OH plate 4 clockwise or counterclockwise about its center 8, using handle 7 to align studs 15 to two screw holes 16 of flange 2.

Attach flange 2 to studs 15, turn OH plate 4 further counterclockwise to remove any end play between studs 15 and the screw holes 16 and make sure that the center of flange 2 is aligned with center 8 of the OH plate 4.

Fix the other flange 2 to the other plate assembly 1 in the same manner, insert one end of pipe 3 onto one flange 2 and the other end of pipe 3 onto the other flange. The position of the plate assemblies on both ends can be adjusted accordingly, then the welding job of pipe 3 to flange 2 can be performed on both ends.

An additional welding table accessory 11 serves as an adjustable height rest mechanism for supporting a substantial portion of a pipe's weight, making it easier to properly fit the flanges 2 to the pipe for successful welding.

The table accessory 11, as shown in FIGS. 8-12, is comprised of a base 21, a cylindrical post 23, a cylindrical knob 22, a snap ring 24, locating pins 25a and 25b, and a screw 26. Screw thread is equipped around the top portion of base 21. There are two cylindrical recess areas in the middle of base 21, the larger one on top and the smaller one at the bottom. Knob 22 is in the shape of a cylindrical tube with internal screw threads 31, so that knob 22 can be screwed on the top portion of base 21 like a bottle cap.

Cylindrical post 23 is made to be fit inside the top recess area of base 21 and slidable up and down along the recess area. A straight groove 29 is made on one side of the body of post 23 to match a key 28 fixed inside the top recess area of base 21 so that post 23 can be moved up and down only, but cannot be rotated relative to base 21.

Snap Ring 24 is used to keep post 23 and knob 22 together so that turning knob 22 clockwise or counterclockwise around the screw threads of base 21 will move post 23 down or up relative to the base 21.

On top of post 23, a cylindrical hole is made to accept the V-pad 27. With the accessory 11 fixed on a welding table, turning knob 22 will change the height of V-pad 27, but not the angle of it; also, turning knob 22 will not turn or change the angle on the pipe sitting on top of the V-pad 27. This will be easier and more convenient to operate when a person uses this accessory 11 to properly set up the flange welding to the pipe. Comparing to the conventional design, turning the post to adjust the height will turn the V-pad also due to friction between the V-pad 27 and the post 23. Conventional design also requires two-handed operation to hold the pipe in position while adjusting the height of the post.

Figure 12:
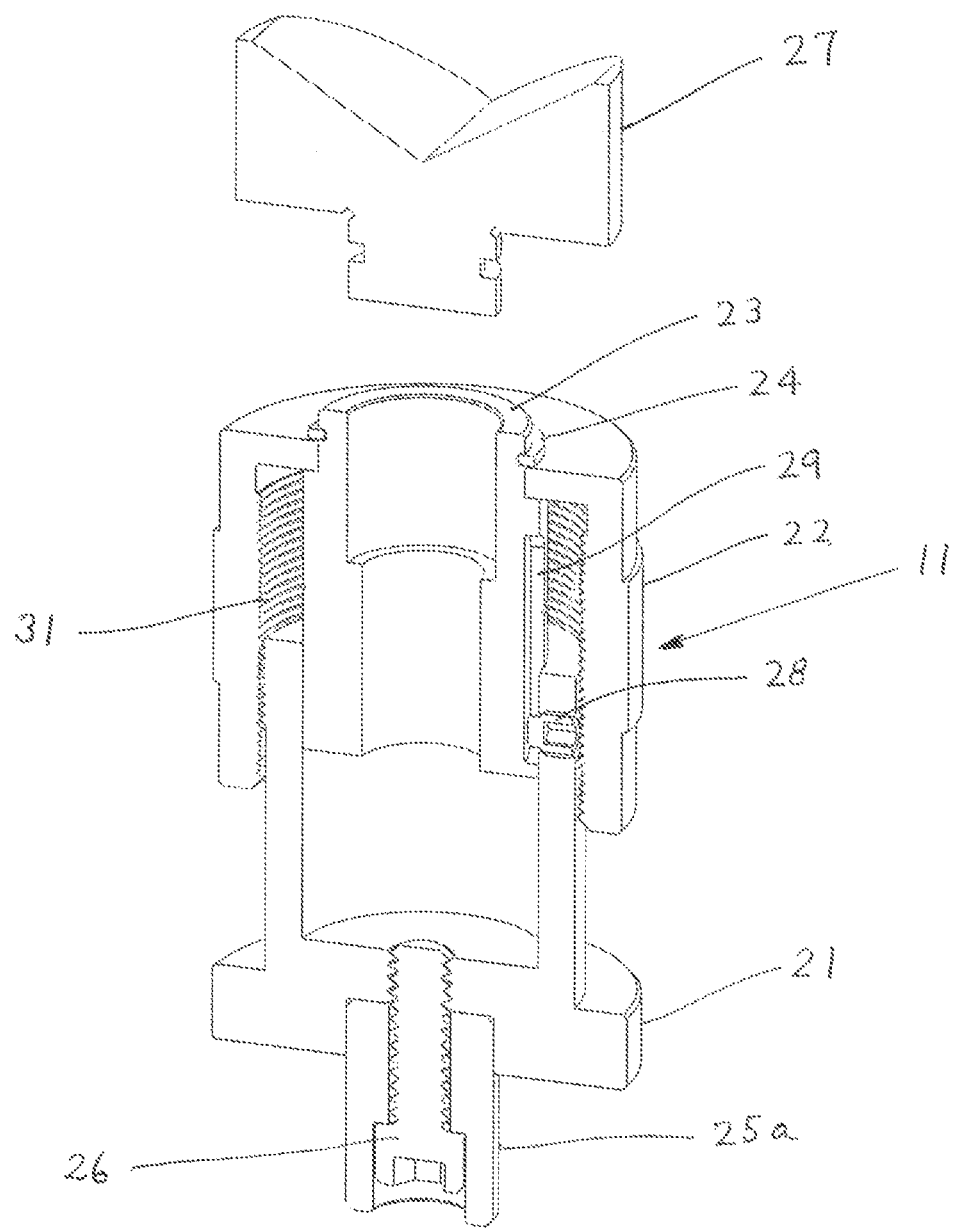
FIG. 12 is a zoomed-in view of the table accessory as shown in FIG. 11, along with the v-pad.

Two slightly different locating pin 25a and 25b are provided. Locating pin 25a is used to fit the screw hole of base 21 with screw 26 as shown in FIG. 12, allowing the accessory 11 to be inserted to any one hole (fixed location) on a welding table to support and prop up the pipe.

Figure 8:
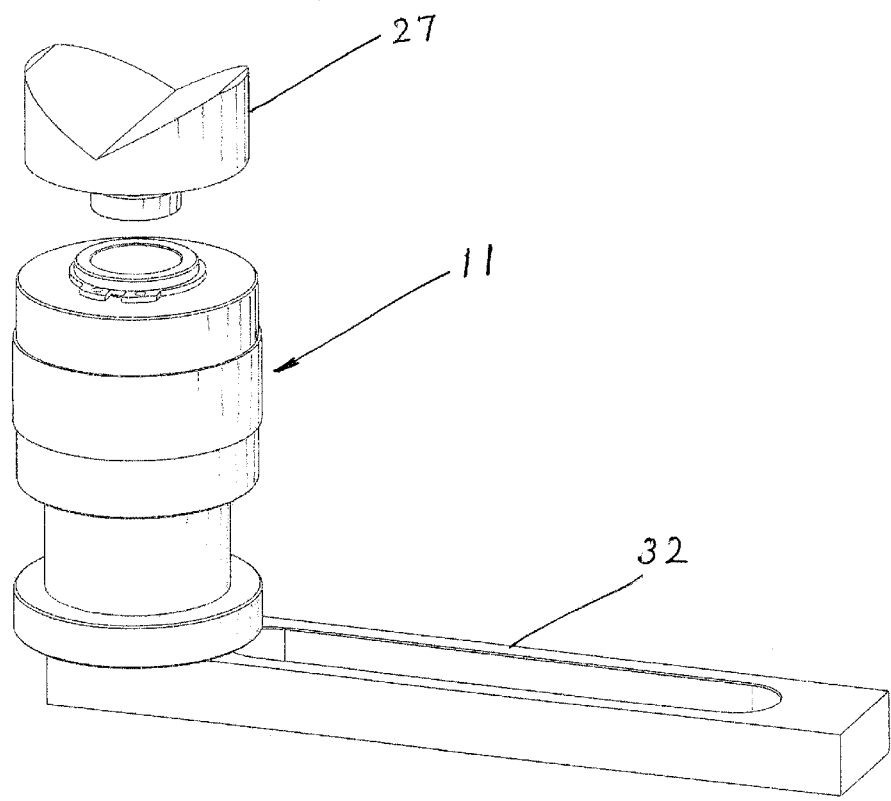
FIG. 8 shows the height adjustment component of the table accessory, with a v-pad on top.
Figure 9:
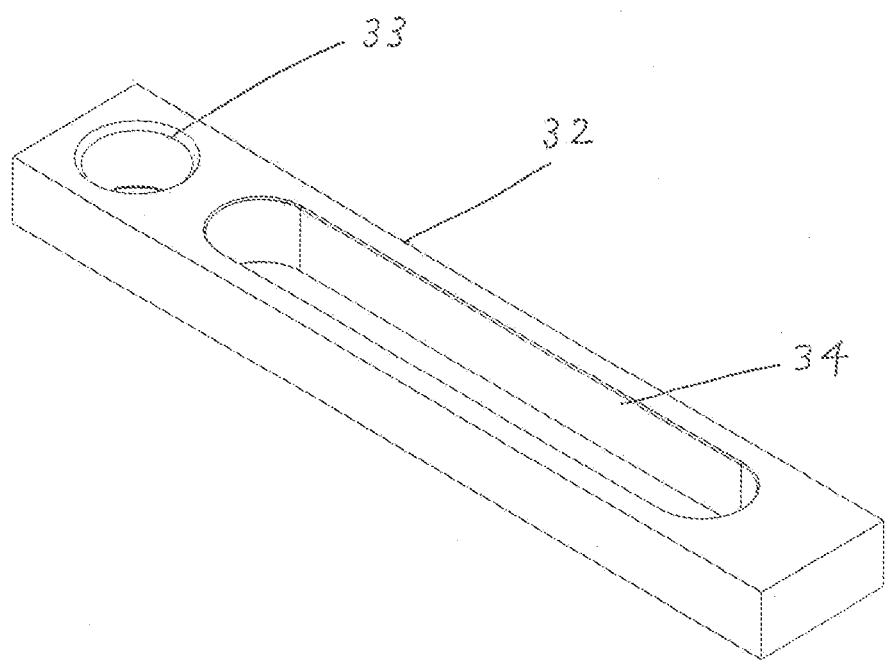
FIG. 9 shows the metal bar to be used along with the table accessory.
Figure 10:
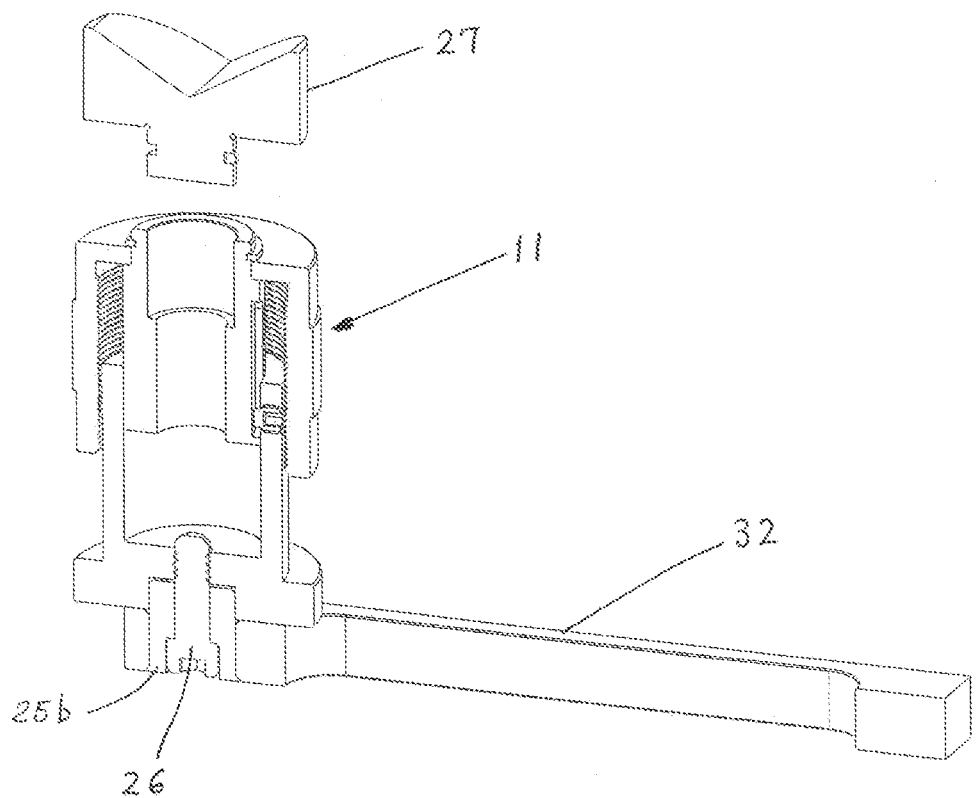
FIG. 10 shows the cutoff view of the table accessory in FIG. 8, depicting the general structure of the table accessory, while seating on a metal bar.
Figure 11:
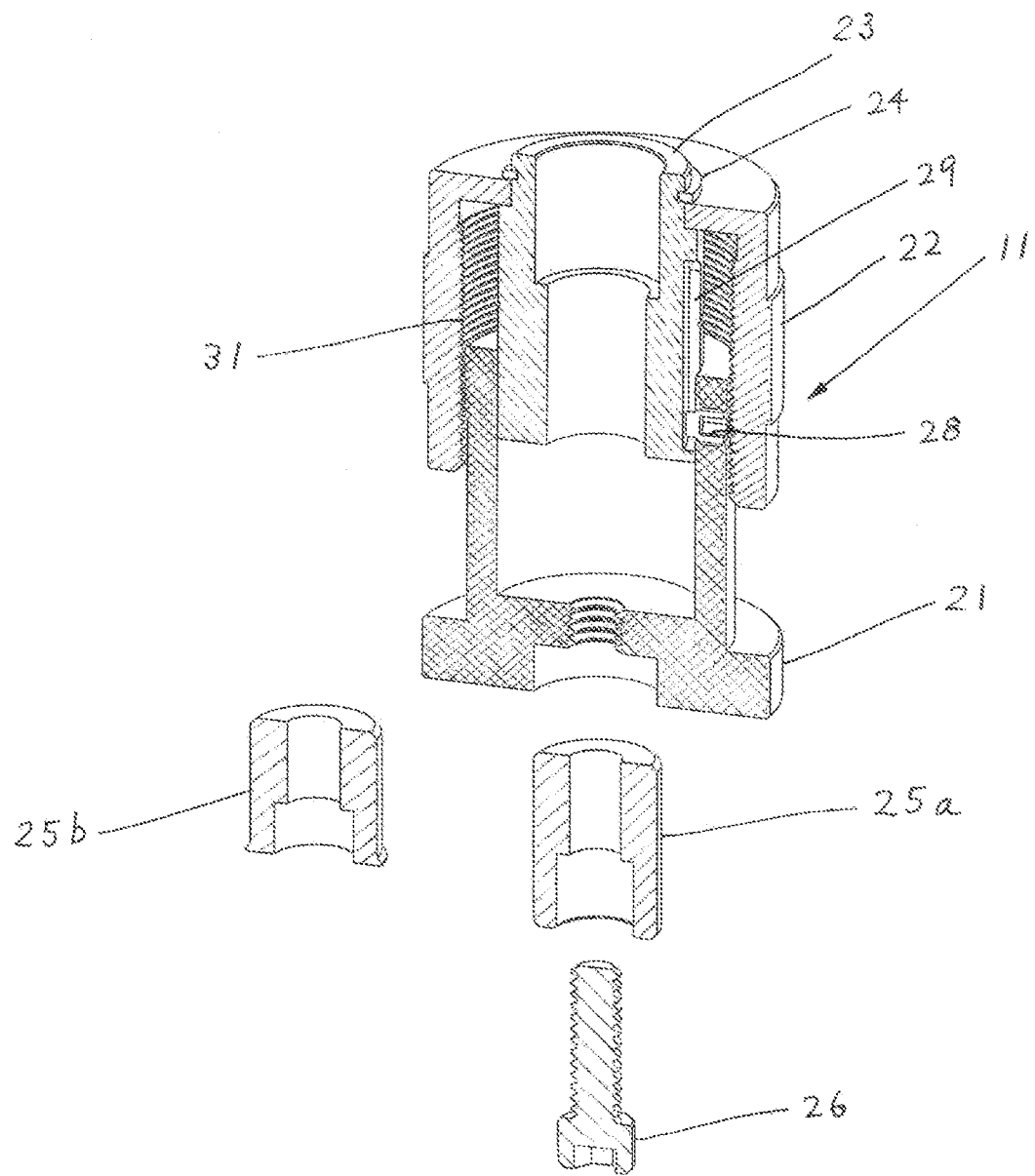
FIG. 11 shows the cutoff view of the table accessory, with exploded view on some components.

Locking locating pin 25b is used to seat accessory 11 on metal bar 32 through hole 33 as shown in FIG. 8 and FIG. 10. The metal bar 32 is then fixed to the welding table with screw through elongated hole 34. This arrangement allows the positioning of the accessory 11 to be anywhere on a welding table.

Erecting support 9 can be used to help the maintenance of a stable position for the plate assemblies 1, usually in a vertical orientation as shown in FIG. 1.

Figure 7:
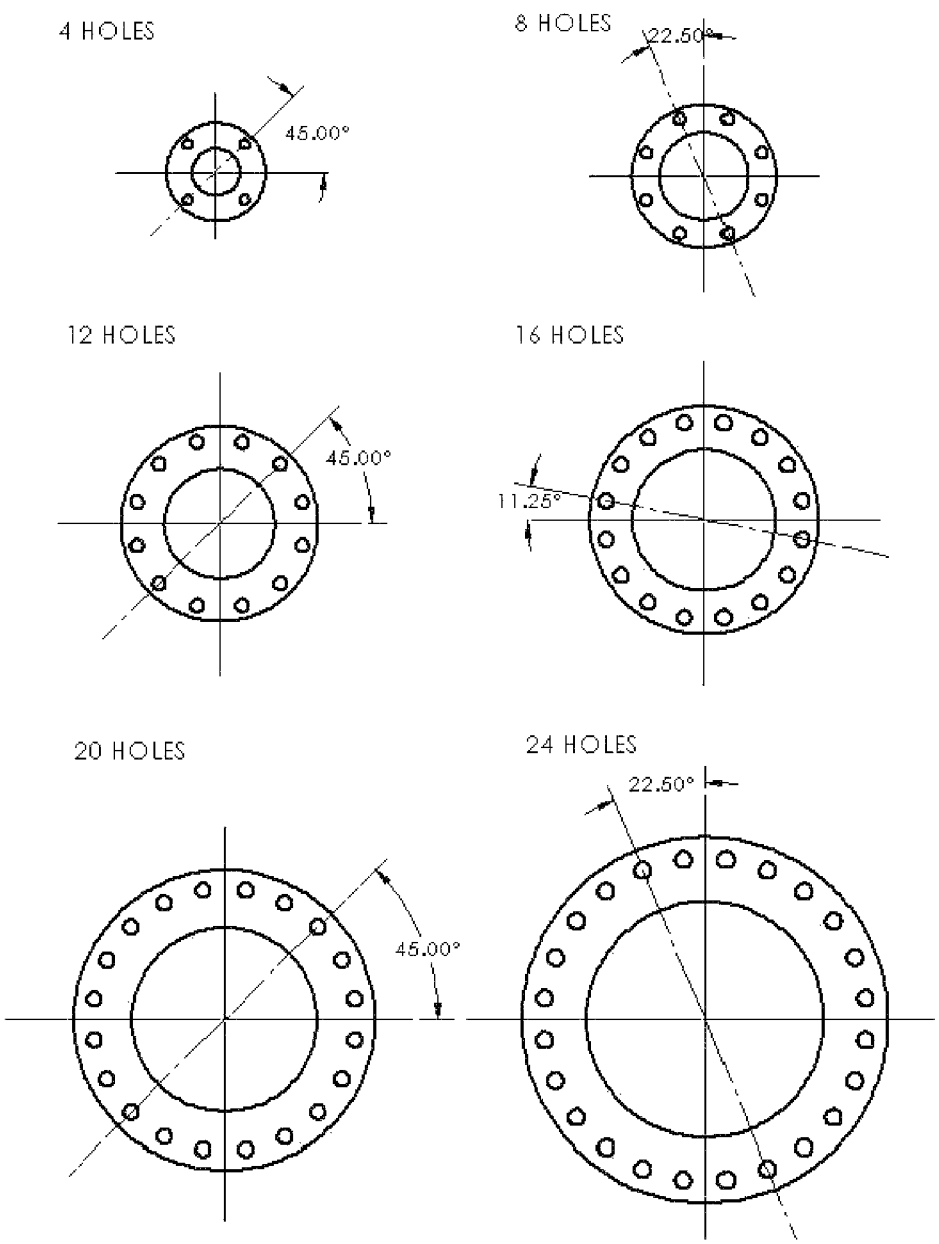
FIG. 7 shows the common flanges with angle indications.

The range of flanges for use with pipes that can benefits from the present invention encompasses the 4-, 8-, 12-, 16-, 20- and 24-hole flanges, as shown in FIG. 7. The angle between two adjacent holes for each type of flange is noted in the different sized flanges, in the customary fashion where the vertical and horizontal positions are defined as having the two top holes of a particular flange being on a horizontal level.

The invention claimed is:

1. A flange pipe alignment tool and fixture for aligning flanges for attachment to ends of a pipe, comprising:
   a welding table;
   a plurality of alignment tools, wherein each of the alignment tools comprise:
      a vertically oriented S plate with a center hole and at least one pair of grooves formed in the S plate radiating from the center hole along a diametrical line, each of said pair of grooves contains an elongated hole through the S plate that is elongated along the diametrical line,
      two sliding blocks, each of the sliding blocks comprising at least one mounting hole and an alignment stud, each of the sliding blocks sliding fitted in each of said pair of grooves of the S plate with the alignment stud projecting away from the S plate, each of said sliding blocks contained in each of said pair of grooves with a screw through said respective elongated hole, and
      an OH plate with a centermost hole and at least one pair of symmetric curved slots formed though the OH plate, the OH plate removably mounted in a vertical orientation to the S plate opposite the at least one pair of grooves, the center hole of the OH plate concentric with the center hole of the S plate, the screws protruding into the slots,
      wherein rotation of the OH plate about the centermost hole relative to the S plate creates a contact between the slot and the screw which symmetrically slides the sliding blocks in the grooves relative to the center hole of the S plate to concentrically adjust a distance between the alignment studs to match a distance between diametrically located holes in the respective flange
   wherein the plurality of alignment tools are mounted to the welding table in a desired location, wherein a one of the plurality of flanges is mounted to a one of the plurality of alignment tools with its pattern of holes oriented by the respective alignment studs, wherein a second of the plurality of flanges is mounted to a second of the plurality of alignment tools with its pattern of holes oriented by the respective alignment studs, wherein one end of the pipe is fixtured substantially concentric and attached to the one of the plurality of flanges and an other end of the pipe is fixtured substantially concentric and attached to the second of the plurality of flanges.

2. The flange pipe alignment tool and fixture of claim 1, wherein said OH plate has three pairs of symmetric, curved slots.

3. The flange pipe alignment tool and fixture of claim 1, wherein said S plate has three pairs of grooves, angled at 11.25 degree, 45 degree and 67.5 degree, relative to a horizontal line.

4. The flange pipe alignment tool and fixture of claim 1, further comprising a pair of erecting supports for contacting the S plate and maintaining the position of the S plate.

5. The flange pipe alignment tool and fixture of claim 1, wherein said OH plate further has a handle.

6. The flange pipe alignment tool and fixture of claim 1, wherein the S plate can be any shape, as long as it has a straight side for sitting flushly on a generally flat surface of the welding table.

7. The flange pipe alignment tool and fixture of claim 1, further comprising a table accessory for maintaining a stable height for a workpiece wherein the table accessory is mounted to the welding table, wherein the table accessory supports the workpiece.

8. The flange pipe alignment tool and fixture of claim 7, wherein said table accessory comprised of a base, a cylindrical post, a cylindrical knob and a snap ring, wherein the cylindrical post has a hole on its upper portion to receive a V-pad and the cylindrical post's diameter is made to be fit inside a top recess area of the base and slidable up and down along the top recess area.

9. The flange pipe alignment tool and fixture of claim 8, wherein the table accessory further comprised of a straight groove on one side of the body of the post, with a matching key fixed inside the top recess area of the base so that the post can be moved up and down but cannot be rotated relative to the base.

10. The flange pipe alignment tool and fixture of claim 9, wherein two slightly different locating pins can be used, one for fixing to any one hole on the welding table, and the other one for fixing to a metal bar, which in turn is fixed to the welding table.

\* \* \* \* \*